United States Patent [19]
Ebner et al.

[11] Patent Number: 5,977,212
[45] Date of Patent: Nov. 2, 1999

[54] OXYGEN SCAVENGING COMPOSITIONS

[75] Inventors: Cynthia Louise Ebner, New Market; Thomas Andrew Blinka, Columbia; Ronald Lee Cotterman, Laurel; Drew Ve Speer, Columbia, all of Md.

[73] Assignee: W. R. Grace & Co.-Conn., New York, N.Y.

[21] Appl. No.: 08/975,959

[22] Filed: Nov. 21, 1997

[51] Int. Cl.$^6$ ..................................................... C08K 9/10
[52] U.S. Cl. .................... 523/210; 252/188.28; 423/219; 523/215; 523/216
[58] Field of Search ....................... 252/188.28; 523/210, 523/215, 216; 423/219

[56] References Cited

U.S. PATENT DOCUMENTS

| | | | |
|---|---|---|---|
| 5,075,362 | 12/1991 | Hofeldt et al. | 524/111 |
| 5,106,886 | 4/1992 | Hofeldt et al. | 524/111 |
| 5,246,753 | 9/1993 | Koyama et al. | |
| 5,283,871 | 2/1994 | Graf. | |
| 5,284,871 | 2/1994 | Graf | 514/499 |
| 5,393,809 | 2/1995 | Gueret. | |

FOREIGN PATENT DOCUMENTS

| | | |
|---|---|---|
| 0328336 | 8/1989 | European Pat. Off.. |
| 0328337 | 8/1989 | European Pat. Off.. |
| 5559633 | 12/1981 | Japan. |
| 59633 | 12/1981 | Japan ................................ 252/188.28 |
| 5864132 | 4/1983 | Japan. |
| 64132 | 4/1983 | Japan ................................ 252/188.28 |
| 5885461 | 4/1985 | Japan. |
| 85461 | 4/1985 | Japan ................................ 252/188.28 |

OTHER PUBLICATIONS

Grent & Hackh's Chemical Dictionary, p. 598, 5$^{th}$ Edition McGraw Hill Book Company New York.

*Primary Examiner*—Paul R. Michl
*Assistant Examiner*—Peter Szekely
*Attorney, Agent, or Firm*—Howard J. Troffkin

[57] ABSTRACT

An oxygen scavenging composition composed of a carrier and an ascorbate based agent impregnated inert, porous particulate material distributed throughout the carrier. The composition is contained within the interior cavity of a container to scavenge oxygen therein. The composition may form at least a part of the interior surface of the container or be present therein in the form of a film, mat, sachet or ceramic.

17 Claims, No Drawings

OXYGEN SCAVENGING COMPOSITIONS

BACKGROUND OF THE INVENTION

The present invention relates to compositions that can be used to retain product quality and improve shelf life of oxygen sensitive materials, and to intermediate shaped structures, e.g., films, coatings, 3-dimensional solids, fibers, webs and the like which contain said composition, as well as to shaped products into or onto which said composition or structure are incorporated or applied to, be part of or attached to the container structure.

The composition is composed of a carrier material which contains porous particulate having impregnated therein at at least one compound capable of combining with oxygen when in the presence of moisture. Specifically, the composition utilizes high surface area microporous particulates which have been impregnated with an oxygen scavenger composition, as fully described herein below. The particulate containing oxygen scavenging composition of the present invention has unexpectedly been found to provide effective absorption of oxygen from the interior of a container without adversely affecting the color, taste or smell of the packaged material contained therein which is normally associated with oxidation by-products of oxygen scavenging systems.

The subject oxygen scavenging composition has the ability to effectively chemically combine with oxygen in contact therewith, such as from the interior of a container, without undue migration of the oxygen scavenging composition or its oxidation by-product(s) out of the matrix. The inhibition of migration is of particular advantage in that it significantly reduces or eliminates adverse effects on the color, taste, or smell of articles in contact with the matrix composition.

In order to enhance preservation, it is standard practice to package food and other materials within laminated packaging material that generally includes a barrier layer, that is, a layer having a low permeability to oxygen. The sheet material can be thin, in which event it is wrapped around the material being packaged, or it can be sufficiently thick that it forms a shaped container body that is provided with a lid or other separate closure. The polymeric sheet material may constitute some or all of the interior exposed surface area of the container or its closure means.

It is known to include an oxygen scavenger in sheet material. The oxygen scavenger reacts with oxygen that is trapped in the package or that permeates into the package. This is described in, for instance, U.S. Pat. Nos. 4,536,409 and 4,702,966 and the prior art discussed in these references. U.S. Pat. No. 4,536,409, for example, describes cylindrical containers formed from such sheet material and provided with metal lids.

When the container is formed of a glass or metal body and is provided with a hermetically sealed metal closure, the permeation of oxygen through the body and the closure is theoretically impossible because of the impermeability of the materials forming the body and closure. As a practical matter, metal cans can reliably prevent oxygen ingress. However, some oxygen ingress may occur by diffusion through the gasket or the like positioned between a container body and its lid. It has long been recognized that when conventional containers of these types are used for the storage of oxygen sensitive materials, the shelf life of the stored materials is very limited. The quality of the packaged material tends to deteriorate over time, in part because dissolved oxygen typically is present in the pack from the time it is filled; and in part due to oxygen ingress which occurs during storage.

When the container is in the form of a can, the can end or other closure in many instances includes push components or pull components which are intended to be, respectively, pushed or pulled in order to allow removal of the fluid or other material in the container without removing the entire closure from the container. These push or pull components are often defined by discontinuities or lines of weakness in the panel of the closure. Problems that can arise at these lines of weakness or discontinuities include the risk of permeation of oxygen into the container and the risk of corrosion of the metal where the normal protective lacquer coating is ruptured at the lines of weakness or at the discontinuities.

It would be very desirable to be able to significantly improve the shelf life while continuing to use conventional materials for the formation of the container body, the container closure and, where applicable, the gasket between the body and closure.

Various types of oxygen scavengers have been proposed for this purpose. For example, it is well known to package iron powder in a sachet for use with dry foods. See Mitsubishi Gas Chemical Company, Inc.'s literature titled "Ageless®—A New Age in Food Preservation" (date unknown). However, these materials require the addition of water soluble salts to enhance the oxygen scavenging rate and, in the presence of moisture, the salts and iron tend to migrate into liquids, producing off-flavors. Similarly, U.S. Pat. No. 4,536,409 issued to Farrell et al. recommends potassium sulphite as a scavenger, with similar results. U.S. Pat. No. 5,211,875 issued to Speer et al. discloses the use of unsaturated hydrocarbons for use as oxygen scavengers in packaging films.

It is known in the art that ascorbate compounds (ascorbic acid, its salts, optical isomers, and derivatives thereof) as well as sulfites, bisulfites, phenolics, etc. can be oxidized by molecular oxygen, and can thus serve as components of an oxygen scavenging formulation, for example, as a component of a closure compound. For example, U.S. Pat. No. 5,075,362, issued to Hofeldt et al., discloses the use of ascorbates in container closures as oxygen scavengers.

U.S. Pat. No. 5,284,871 issued to Graf relates to the use of an oxygen scavenging composition made of a solution of a reducing agent and dissolved species of copper which are blended into foods, cosmetics and pharmaceuticals. $Cu^{2+}$ ascorbate is used in the examples. The reference indicates that relatively high level of $Cu^{2+}$ (~5 ppm) are required in the food for scavenging to be effective but indicates that small amounts of the $Cu^{2+}$ can combine with oxygen in food to cause food spoilage. In order to avoid spoilage, one is required to reduce the amount of headspace $O_2$ or partially flush the container with an inert gas (Col. 5, lines 32–39). A paper by E. Graf, "Copper (II) Ascorbate: A Novel Food Preservation System", Journal of Agricultural Food Chemistry, Vol. 42, pages 1616–1619 (1994) identifies copper gluconate as a preferred raw material.

It is also well known in the scientific literature (See "Polymer Compositions Containing Oxygen Scavenging Compounds", Teumac, F. N.; et al. WO 91/17044, published Nov. 4, 1991, filed on May 1, 1991) that the oxidation rate of ascorbate compounds can be increased significantly by the use of catalysts. Typical oxidation catalysts for ascorbic acid and its derivatives are water soluble transition metal salts. When such catalysts are combined with an ascorbate compound in a polymeric matrix, e.g., a PVC closure formulation, they are effective in catalyzing the oxidation of the ascorbate compound, and increase the oxygen scavenging rate of the ascorbate.

In each of the above references, the active agents of the oxygen scavenging systems utilized readily transfer into the food or other packaged product or materials which produce oxidation by-products which are known to adversely affect a wide range of packaged material.

It is highly desired to provide an effective oxygen scavenging system suitable for packaging applications which has good oxygen absorption capabilities and capacity and which does not itself or by its by-products, provide material which adversely effects the color, taste or smell of the packaged material.

It is further desired to provide an effective oxygen scavenging system which has the active scavenger agent contained within a carrier and the agent still provides effective scavenging capacity.

It is further desired to provide an effective oxygen scavenging system which is thermally stable and, thereby, capable of allowing the packaged system to undergo pasteurization or sterilization.

SUMMARY OF THE INVENTION

The present invention is directed to an oxygen scavenging composition capable of providing good oxygen absorption capabilities while not adversely affecting the color, taste or smell of material packaged within a container which has said composition as a part thereof. The present oxygen scavenging composition is formed of a polymer or the like carrier containing a highly porous particulate material having impregnated therein an oxygen scavenging system capable of being activated by moisture. The present invention is further directed to a shaped structure containing or derived from the subject composition and to containers which are formed with or contain the subject composition.

DETAILED DESCRIPTION

The present invention is directed to an oxygen scavenging composition formed of a carrier containing a high surface area, microporous particulate material which has been impregnated with an effective oxygen scavenging amount of an oxygen scavenging system, as fully described herein below.

The carrier can be a polymer matrix in which the subject microporous particulate material is substantially uniformly distributed, or a film or mat (woven or non-woven) having the subject porous particulate material substantially uniformly distributed therein or deposited thereon, or a moisture permeable pouch or sachet which contain the subject microporous particulate distributed therein.

The present invention further provides an improved container for packaging materials, such as food, beverages and the like, which are susceptible to oxidative degradation. The present improved container is capable of retaining product quality and enhanced shelf life of the packaged material without adversely affecting the color, taste or smell of the packaged material by the present oxygen scavenging composition.

The oxygen scavenging composition of the present invention is composed of a microporous particulate material which has an oxygen scavenging, moisture-triggerable system impregnated and distributed throughout the material. The microporous particulate material is either further distributed throughout the carrier matrix or carried as a coating thereon. The porous particulate material should generally be a high surface area particulate material. The surface area (BET) may be from about 1 to 950 square meters per gram with from about 10 to 800 square meters per gram being preferred. The high surface area is provided for by the porosity of the particulate material. The pore volume of the particulate material should be at least about 0.07 cc/gm with from about 0.07 to 4 cc/gm being preferred and from about 0.1 to 2 cc/gm being most preferred. The particulate size of the particulate material should be from about 0.007 to 100 micron diameter with from 0.007 to 25 microns being preferred. It is preferred that the particulate have a pH of up to about 10 and more preferably up to about 8. It is most preferred that is pH be from about 4 to about 7.5.

The particulate material may be composed of a material which has a low degree of water solubility or is substantially water insoluble to provide a material which is substantially insoluble and inert with respect to the packaged products of the intended application. The term "inert" as used herein and in the appended claims refers to the characteristic of lack of reactivity with respect to the polymer matrix and the packaged material with which the resultant subject composition is contemplated for use. For example, where the packaged product is organic, the material may have some degree of water-solubility. However, if the packaged product has an aqueous component, the material chosen should be water-insoluble. Where the packaged product contains neither organic or aqueous components (e.g., electronic components), the material's solubility will be immaterial with respect to the application.

The particulate materials found useful herein rely on the high surface area and high porosity properties of the material. These properties have been unexpectedly found to be capable of being impregnated with moisture triggerable oxygen scavenging systems; to provide a means of providing high amounts of active oxygen scavenging agent useful for the purposes described herein; and to be capable of scavenging oxygen without adversely effecting the color, taste or smell of packaged product.

Representative of particulate materials which are insoluble in water and, which may be used, singly or in combination, are metal oxides, sulfides, and hydroxides, such as those of silicon, aluminum, calcium, magnesium, barium, titanium, iron, zinc and tin; metal carbonates such as those of calcium and magnesium; minerals such as montmorillonite, kaolite, attapulgite, sepiolite, diatomaceous earth, talc, vermiculite, and synthetic and natural zeolites; precipitated metal silicates such as calcium silicate and aluminum polysilicate; alumina silica gels; activated carbon; aluminum phosphate; and the like. These materials are preferred for most applications and, of these, zeolites, calcined hydrotalcite and oxides of silicon, aluminum, and titanium are most preferred.

Illustrative of low water soluble particulate material found useful herein are certain inorganic salts such as, for example sulfates as, for example, those of calcium or potassium; phosphates as, for example, those of calcium; and carbonates as, for example, those of calcium; and the like. These materials are most useful in non-food applications.

As stated above, the particulate material should have a high surface area and, therefore, have high porosity. The pore volume of the particulate should be at least about 0.07 cc/gm, with from about 0.1 to 4 cc/gm being preferred. The framework structure of the particulate material can be viewed as enclosed cavities which are linked by pore channels and both the cavities and channels have minimum pore diameter of at least 3 angstroms to thus permit free passage of sufficient moisture as well as oxygen molecules to the oxygen scavenging agent to initiate and provide oxygen scavenging. The subject material either has or can be made to have, by known methods, the required surface area, pore volume and pore diameter dimensions.

The subject particulate material should be impregnated with a moisture-triggerable oxygen scavenging agent to provide a coating of the agent therein, as fully described herein below.

The oxygen scavenging system found useful as the impregnate in the above-described particulate material comprises agents which are capable of initiating oxygen scavenging when in contact with moisture and oxygen gas. Such agents are alkali and alkaline earth metal sulfites, bisulfites, and dithionates as well as organic agents selected from ascorbate compounds and phenolic compounds.

The term "ascorbate compound" as used herein and in the appended claims refers to ascorbic acid in either its D or L form and any derivative, analog or salt thereof, including, for example, erythorbic acid and mixtures thereof. It is preferred that the ascorbate compound be selected from D- or L- ascorbic acid, their alkali and alkaline earth metal salts (e.g., sodium, potassium or calcium salts) or fatty acid derivatives of ascorbic acid as well as mixtures thereof. Certain of the above ascorbate compounds, especially the sodium ascorbate salts, are particularly preferred when the composition of the present invention is to be used in a food related application, since this material is widely accepted for contact with food and has achieved "General Recognized As Safe" (or "GRAS") status by the U.S. Food and Drug Administration for such applications.

The term "phenolic compound" as used herein and in the appended claims refers to compounds having an aromatic ring or condensed aromatic ring with at least one hydroxy group pendent therefrom. The aromatic ring or condensed aromatic ring moiety can further have unsubstituted or substituted alkyl, aryl, alkaryl groups wherein the substitute group is an amine, amide, oxygen (e.g., methoxy) hydroxy or carbonyl group. The phenolic compound can be in its free form or can be in the form of an alkali or alkaline earth metal salt. Examples of phenolic compounds include, phenol, pyrocatechol, resorcinol, pyrogallol, pyrocatechol, monoethyl ether, resorcinol monoethyl ether, hydroquinone, catechol, 1,2,4-trihydroxy benzene, tetrahydroquinone, 2,4-dibutylphenol, 2,6-dibutylphenol and the like.

When an ascorbate compound is used as the oxygen scavenger agent, the rate of oxygen scavenging can be enhanced by combining the ascorbate compound with a catalyzing compound. It has been found that a transition metal compound, in the form of an organic or inorganic salt, or as a complex or chelate, is useful in accelerating (i.e., catalyzing) the rate of oxygen scavenging by the ascorbate compound. The preferred metal compounds are those of in lieu there of the metals of the Periodic Table forming the series from scandium to zinc (i.e., Sc, Ti, V, Cr, Mn, Fe, Co, Ni, Cu and Zn) with iron and copper compounds being more preferred. Copper is especially preferred for use with this invention. The transition metal catalyst may be in the form of an organic chelate such as those of ethylene diamine tetracetic acid (EDTA) or its alkali salts as, for example, iron complexes of EDTA (e.g., monoferrous disodium EDTA; monoferrous monosodium EDTA and the like). The transition metal catalyst may, alternately, be in the form of an inorganic transition metal salt such as, for example iron chloride, iron sulfate, copper chloride, copper sulfate and the like. The transition metal catalyst, when present, should be present in an amount to provide from 10 to 10,000 parts per million (ppm) of transition metal based on the ascorbate compound present.

The subject particulate material has been unexpectedly found to provide a desirable means of providing large amounts of oxygen scavenging agent to the subject composition and, thereby, provide enhanced capacity and activity to scavenge oxygen while not allowing the initial oxygen scavenging agent and/or any resultant oxidation by-product materials to adversely effect the color, taste or smell of articles in contact with the subject composition.

The above described oxygen scavenging agent is impregnated into the highly porous particulate material described above to cause the agent to be entrapped within the pore volume of the particulate material and to be coated on the high surface area of said particulate material. The porous particulate material is contacted with a solution of the oxygen scavenging agent to permit the agent to enter and occupy the pore volume of the particulate material. The solvent of the solution may be selected from any inorganic or organic liquid in which the component(s) forming the oxygen scavenging agent are highly soluble to provide the desired amount of agent. The preferred solvents are deoxygenated water or lower alcohol. Most preferred is deoxygenated water. The liquid of the solution is then removed to provide the desired oxygen scavenging agent impregnated porous particulate material. Substantially saturated solutions are preferred. A volume of the solution is mixed with the porous material in a ratio of solution volume to material total pore volume of from 0.5 to 2 and preferably from 0.8 to 1.2 to permit substantially full impregnation and surface coating of the porous material's surface area. Excess solution may be used but is not preferred. Once the impregnation is completed, the solvent is removed by subjecting the impregnated porous material to elevated temperature, reduced pressure or both.

Thus, the oxygen scavenging agent is substantially completely entrapped in the pore volume and/or coated on the surface area of the porous material.

The preferred oxygen scavenging system of the present invention is formed by impregnating an ascorbate compound alone or in combination with a transition metal catalyst, as described above, into a high surface area, microporous particulate material.

The resultant material has the oxygen scavenging agent coated throughout the porous material's surface area and contained within its pore volume. The resultant material preferably has a major portion of the surface area coated, with preferably at least about 60 percent and most preferably at least about 80 percent of the surface area coated with the scavenging agent. Lesser coverage may be acceptable where it provides sufficient oxygen scavenging agent for a particular application's need. The amount of scavenging agent impregnated in the porous material should not be an amount which causes the agent to reside in the pore volume and block the porosity of the particulate material. The exact degree of impregnation and coating can be readily determined by one skilled in the art having the knowledge of the pore volume and surface area of the porous material. The higher the porosity and surface area, the lower the degree of impregnation and coating is required to provide at least a minimal oxygen scavenging activity. However, the presently preferred high surface area particulate materials provide the ability to have an oxygen scavenger material of high capacity. Such capacity enables one to achieve extended storage capacity of the resultant packaged product. The amount of oxygen scavenging agent will depend on the anticipated application of the scavenging composition. Where large amounts of composition are used to scavenge small volumes of oxygen (such as in can coating applications), the amount of oxygen scavenging agent impregnated within the particulate material can be as low as about 0.5 weight percent of the particulate and preferably at least 1 weight percent of the particulate. However, in other conventional applications, such as cap liners and the like, where the loading of the particulate in the polymer carrier is low and/or the amount of composition is small, the amount of oxygen scavenging agent should be at least about 5 weight percent, preferably from 5 to 25 weight percent, more preferably from 10 to 30 weight percent and most preferably from 15 to 25 weight percent based on the weight of the coated particulate. Amounts greater than about 30 weight percent (preferably 25 weight percent) are not preferred as overloaded particulate material may not exhibit the capacity to entrap all of the agent and/or its oxidation by-products. The exact amount of oxygen scavenging agent required for a particular application can be readily determined by the artisan. The present invention provides a means of achieving a wide range of scavenger agent content including high weight percentages. It has been unexpectedly found that the presently described impregnated porous particulate can provide good oxygen scavenging activity and enhanced capacity while inhibiting migration of the components of the oxygen scavenging agent and the oxidation by-products (e.g., aldehydes, ketones, and the like) which normally adversely effects the color, taste and/or smell of articles in contact with the matrix composition.

The impregnated porous material described above is a finely divided solid that is particularly suited to replace part or all of the filler commonly found in sealant compositions which is an application contemplated herein. The subject composition as a whole is preferably anhydrous. Thus, it is preferred that the carrier component of the composition be a polymeric matrix which is also preferably anhydrous. Generally, the polymeric matrix substantially protects the scavenger from moisture under normal atmospheric conditions and, therefore the oxygen scavenger agent remains substantially inert to scavenging activity. However, once a high degree of moisture is attained, as in a closed package environment of food products, the scavenging activity is initiated or triggered. The polymer matrix should be sufficiently porous to permit moisture and oxygen to pass into the matrix's mass and contact the formed impregnated porous particulate material.

It has been unexpectedly found that certain porous material, especially those of silicon oxides, retain a sufficient amount of water molecules within its structure to permit the impregnated porous material of the present invention to provide oxygen scavenging activity even where no additional moisture is introduced. Such materials are preferred where dry package conditions exist (e.g., electronic equipment). In such instance, the impregnated particulate material, alone or in a carrier, is maintained under substantially anaerobic (absent of oxygen) conditions until placed in use as an oxygen scavenging packaging material.

In one embodiment of the present invention, the carrier of the subject composition comprises a polymeric matrix material, that is to say polymeric material that will form a solid matrix having distributed therein the oxygen scavenging agent impregnated microporous particulate material. The polymeric matrix material will be selected having regard to the nature of the composition (dispersion, latex, plastisol, dry blends, solution or melt) and its utilization as part of the container in a conventional manner.

The polymeric matrix material is chosen from at least one polymeric material that can form a solid, or semi-solid matrix. The polymeric matrix material can be derived from a variety of polymers which are available from a variety of bulk physical configurations such as dispersion, latex, plastisol, dry blend, solution, or melt (e.g., thermoplastic meltable polymer). The particular physical configuration of the polymer selected will depend on the end structure into which the subject composition is, eventually formed or incorporated. The polymeric matrix is derived from polymer types which may be thermoplastic or thermosetting.

The primary functions served by the polymer matrix for purposes of the present invention are to provide a compatible carrier (a material which is stable under normal packaging temperature conditions and does not deactivate the oxygen scavenging ability of the oxygen scavenger agent impregnated in the porous material) for the oxygen scavenging agent impregnated particulate material which is fully described herein above and to permit ingress of both oxygen and water into the composition and to permit them to come in contact with the oxygen scavenging agent. The scope of the polymer in general can be very broad. However, the polymer matrix may also be selected to perform additional functions depending on the physical configuration in which it is provided in a final structure into which it is shaped or incorporated. Thus, the particular polymer or mixture of polymers selected ultimately will be determined by the end use in which it exerts its oxygen scavenging effect.

Accordingly, suitable polymers from which the polymeric matrix may be derived include vinyl polymers, polyethers, polyesters, polyamides, phenol- formaldehyde condensation polymers, polysiloxanes, ionic polymers, polyurethanes, acrylics and naturally occurring polymers such as cellulosics, tannins, polysaccharides, and starches.

Suitable materials for use as the polymeric matrix component of latex compositions, e.g., for can ends, are described in U.S. Pat. No. 4,360,120; U.S. Pat. No. 4,368, 828 and EP 0182674. Suitable polymeric materials for use when the compositions are organic solutions or aqueous dispersions are described in U.S. Pat. No. 4,360,120; U.S. Pat. No. 4,368,828; and GB 2,084,601. Suitable materials for use in thermoplastic compositions include the materials proposed in U.S. Pat. No. 4,619,848; U.S. Pat. No. 4,529, 740; U.S. Pat. No. 5,014,447; U.S. Pat. No. 4,698,469; GB 1,112,023; GB 1,112,024; GB 1,112,025 and EP 129309. The teachings of each of the references cited herein above are incorporated herein by reference in their entirety.

In particular, the polymeric material can be generally selected from polyolefins as, for example, polyethylene, polypropylene, ethylene/propylene copolymers, acid modified ethylene/propylene copolymers, polybutadiene, butyl rubber, styrene/butadiene rubber, carboxylated styrene/ butadiene, polyisoprene, styrene/isoprene/styrene block copolymers, styrene/butadiene/styrene block copolymers, styrene/ethylene/butylene/styrene block copolymers, ethylene/vinyl acetate copolymers, ethylene/acrylate and ethylene/(meth) acrylate copolymers (for instance, ethylene/ butyl acrylate or ethylene/butyl methacrylate copolymers), ethylene/vinyl alcohol copolymers, vinyl chloride homopolymers and copolymers, styrene/acrylic polymers, polyamides, and vinyl acetate polymers, and blends of one or more of these. Polyethylenes found useful in forming the subject composition include high density polyethylene (HDPE), low density polyethylene (LDPE), very low density polyethylene (VLDPE), linear low density polyethylene (LLDPE), ultra-low density polyethylene (ULDPE) and the like as well as copolymers formed from ethylene with one or more other lower alkenes (e.g., octene) and the like.

Compositions according to the invention may utilize a polymeric matrix composed of thermoplastic polymer as, for example, polyethylene or copolymers of polyethylene such as, ethylene/vinyl acetate and the like or polyethylene blends such as, blends of HDPE and butyl rubber; polyethylene and ethylene/vinyl acetate copolymer; as well as polyethylene and styrene/butadiene/styrene block polymer and the like. The polyethylene, if used, is preferably a low density polyethylene, and may be a very low or ultra low density polyethylene which may be branched or linear. The ethylene/vinyl acetate copolymer, if used, preferably has a melt index in the range 3 to 15, preferably 5 to 10, and generally contains 5 to 40%, preferably 5 to 30%, vinyl acetate.

Particularly preferred compositions are a plastisol or a dry blend of polymer may be used in combination with a plasticizer for forming the polymer matrix. Suitable materials for use when the compositions are plastisols include vinyl chloride homopolymers and copolymers. Instead of preparing such compositions as true plastisols, they may be provided as dry blends of the polymer and plasticizer. The proportion of plasticizer present in a vinyl resin plastisol may be any conventional proportion, typically from 30 to 150 weight parts of plasticizer per hundred weight parts of vinyl resin.

The polymer carrier may be formed from various thermosetting resins such as polyurethanes, phenolics, epoxy-ester resins, epoxy resins, polyesters and alkyds. These resins are normally formed into solutions or suspensions with organic liquids and applied to the inner surface of a container followed by application of elevated temperature to remove the liquid and cause solidification (e.g., by crosslinking) of the resin coating on the substrate.

The polymeric matrix of the composition may further contain conventional plasticizers, including phthalates, adipates, glycols, citrates and epoxidized oils and the like. Examples include for example dioctyl phthalate, diisooctyl phthalate or diisodecyl phthalate, which are readily available. Other usable plasticizers are butyl benzyl phthalate, acetyl tributyl citrate, ethyl diphenyl phosphate and diisobutyl phthalate. One particularly useful combination of plasticizers for use with a vinyl chloride/vinyl acetate copolymer resin is a mixture of diisodecyl phthalate and diisooctyl phthalate in a weight ratio of about 7–8:1.

A preferred aspect of the invention is that the scavenger should remain substantially inert in the composition and in the gasket or other solid deposit formed with the subject composition until the composition is on or in a sealed container. Exposure of the composition to high humidity that normally exists within a sealed container will, therefore, result in sufficient permeation of moisture into the composition and cause the subject oxygen scavenger to initiate a satisfactory degree of scavenging. This will result in improved shelf life of the packaged material. In addition, the scavenging reaction can be accelerated by heating the composition sufficiently while in the closed container to cause increased permeation of moisture. Thus, preferably the oxygen scavenger agent is a material that remains substantially inert in the carrier until the scavenging reaction is accelerated by heating in the presence of moisture. As stated above, it has been found that certain particulate material, such as the silicon oxides, retain a sufficient amount of water molecules even after subjection to conventional drying procedures to provide moisture required to cause oxygen scavenging. It is preferred that compositions having such particulate material be stored under an inert atmosphere until used.

Preferably the scavenging reaction of the present composition is accelerated by pasteurizing (typically at 50°–100° C.) or sterilizing (typically at 100°–150° C.) the container after filling it with an aqueous fill and sealing it. This triggering appears to be a consequence of the subject composition, when heated, permitting moisture to permeate into the composition and contact the subject scavenger agent containing particulate material. The moisture becomes trapped in the composition, thereby bringing the scavenger agent into contact with sufficient water to permit reaction with the oxygen present. This oxygen may permeate through the composition either from oxygen trapped within the container when it was filled or which subsequently enters the container from the surrounding atmosphere.

The polymeric matrix of the subject compositions may further contain inert filler, slip aids, process aids, pigments, stabilizers, anti-oxidants, tackifying resins, foaming agents and other conventional additives in conventional amounts, depending upon the nature of the composition and its final use. If the polymer matrix is part of a thermoplastic composition, the total amount of such additives is generally below 10%, most preferably below 3%, based on the total weight of the composition. However, when the composition is a plastisol, dispersion, organic solution or latex, the amounts of additives based on polymeric material may be higher. When an anti-oxidant is incorporated, it should be present in amounts capable of stabilizing the polymeric composition against degradation due to free-radicals formed during processing. However, the amount of anti-oxidant should be small enough to permit the oxygen scavenger component of the composition to effectively react with molecular oxygen. The specific amount will depend on the anti-oxidant used and can be determined by minor experimentation.

The composition of the invention may be formulated in any convenient form, such as a melt, plastisol, organic solution, dry blend, latex or dispersion. The main ingredients of the composition, apart from the oxygen scavenger agent impregnated particulate material, are normally typical of those conventionally present for the intended purpose. It is preferred that the total composition should be non-aqueous (i.e., an anhydrous solution, plastisol or thermoplastic melt) so as to prevent initiation of the reaction of the scavenger within the composition. Alternatively, the scavenger may be encapsulated in a carrier sufficient to prevent it from contacting water until within the closed environment of the container.

The polymer matrix carrier of the subject composition may be selected from those used to form coatings on at least a portion of the interior surface of a package (e.g., a rigid container such as a can, can lid, box or the like). The polymer matrix can be selected from polymer classes commonly referred to as epoxides, phenolics (e.g., phenol-formaldehyde condensation polymer), lacquers (e.g., cellulose esters or ethers, shellac, alkyl resins and the like), polyurethanes and the like. The carrier matrix may be mixed with the above described oxygen scavenger agent impregnated particulate material to provide an encapsulated particulate which may be subsequently used in a second polymer matrix or applied onto (such as by solvent or melt application) the surface of a second carrier material.

The subject composition can also be utilized to form a film which carries the present oxygen scavenger agent impregnated porous material. The carrier can be formed from a polymeric material, such as those described herein above, capable of forming a film and upon the surface thereof is deposited the present oxygen scavenger. The surface of the film can be coated with the subject oxygen scavenger agent impregnated material by forming a suspension or dispersion of its powder in a polymer and depositing the suspension or dispersion by a conventional means, such as spraying or knife coating application or the like, directly onto the surface of the carrier film. The particular nature of the carrier film will depend upon the application contemplated and the ability of the carrier formed to have the oxygen scavenger adhered to its surface and substantially retain its integrity during use.

The carrier can, alternately, be in the form of a fibrous (woven or non-woven) mat. The subject oxygen scavenger composition is contained in the interstices of the mat structure. The fibers forming the mat may be formed from any suitable material or synthetic fiber such as cotton, glass, nylon, polyethylene, and copolymers of ethylene with one or more ethylenically unsaturated monomer, polypropylene and copolymers of propylene with one or more ethylenically unsaturated monomer and the like. The particular nature of the carrier mat will depend upon the application of its use and the ability of the mat to retain oxygen scavenger material within the interstices of the mat structure during use. The scavenger can be deposited into the mat structure by any means such as by dipping the mat into a dispersion or suspension of the scavenger and then removing the liquid from the mat or by first forming particulates of scavenger/polymer composition which is melt deposited onto and into the mat structure.

In another embodiment, the subject oxygen scavenger composition can be retained within a carrier in the form of a pouch or sachet of suitable size to be inserted in a container having an oxygen sensitive material therein. The pouch or sachet should be sufficiently porous to permit moisture and oxygen to penetrate through the pouch or sachet forming material at ambient temperature conditions. The subject oxygen scavenger composition is thus composed of the pouch or sachet carrier having therein the oxygen scavenger agent impregnated porous particulate carrier, per se, or further contained in a polymer carrier and provided for in the form of small particles of sufficient particulate size to permit the sachet structure to retain the oxygen scavenger therein. The pouch or sachet can be formed from natural or synthetic materials such as paper, cotton cloth, polymer films and the like in manners well known to the packaging technology.

A fourth embodiment is to utilize a carrier in the form of a porous inorganic material, such as a ceramic having the oxygen scavenger agent impregnated porous particulate material distributed therein. The ceramic can be formed into any desired shape (e.g., spheres, cubes, cylinders and the like) and size which is suitable for insertion into the container having the oxygen sensitive material. Useful porous inorganic materials include clay, cement pastes and the like.

It has been found that the above described oxygen scavenger compositions can be used for the preservation of oxygen sensitive foods stored at ambient conditions. The present compositions have an advantage over those compositions having organic oxygen scavengers directly mixed into and forming a filler of a direct polymer matrix because the present compositions inhibit the release of organic oxidation by-products which contaminate the food material. Further, the present compositions exhibit minimal migration of metal ion, metal by-products or metal salts into packaged food compositions. Therefore, the present invention unexpectedly provides a highly desired oxygen scavenger composition which does not cause discoloration or detract from taste of the packaged food product.

The oxygen scavenger component of the present invention is a high surface area, porous, particulate material that has impregnated therein a moisture-triggerable oxygen scavenging agent. Such agent can be a sulfite, bisulfite, or dithionate salt of an alkali or alkaline earth metal or mixtures thereof or can be a phenolic compound or mixtures thereof or of at least one ascorbate compound alone or combined with a transition metal catalyst compound. It has been found that the nature of the system is such that large amounts of the oxygen scavenging agent is supported by the porous material in a manner which causes the agent to be highly reactive with molecular oxygen yet to be entrapped in a manner which substantially prevents migration of the component(s) of the agent or its oxidized product into the packaged material.

It may be desirable to include in the composition a material, for instance a surfactant such as sodium dodecylbenzene sulphonate, which will increase the permeability of the composition to water. Suitable amount of a surfactant, such as this, is between 0.1 and 1.0% by weight.

The amount of the subject oxygen scavenger agent containing particulate is dependent on the type of application. When the particulate is incorporated into a gasket, the amount is normally at least 0.5 weight percent based on the polymeric matrix material, generally at least 1% and preferably at least 2%. It is generally unnecessary for the amount to be above 20% and 4%–10% is often a convenient maximum.

In the case of a plastisol, lacquer, or hot melt applied to the center panel of a closure, where the matrix does not otherwise serve as a gasket, scavenger particulate loadings can be much higher. For example, loadings of 20 weight percent to 60%, or in some cases up to 90% are workable.

When the composition is in the form of a film, mat, pouch or sachet, the oxygen scavenger should be present in an amount to effectively scavenge oxygen during the contemplated storage period of the container for the appropriate contents. An amount in the range of from 0.01 to 2 grams of the oxygen scavenging agent containing porous particulate is normally sufficient to provide desired oxygen scavenging capacity in a normal size (50–1000 ml) container.

The present composition can be used as part of a package container which can provide storage stability to the material packaged therein without detracting from the material's taste, odor or smell. The present composition should be exposed to the inner atmosphere of the resultant sealed container in any form such as a coating on all or a part of the inner surface of the container body or closure means (e.g., lid, can end) or as an insert in the form of a film, mat, pouch, sachet or ceramic structure.

The invention formed with a polymer matrix in the form of a film can be applied as a center panel lining on a container closure. The closure can be a cap, can end, lid stock or film. The invention also includes container closures carrying a solid deposit formed on the closure from a polymer matrix or film composition and that is positioned to seal around, or over a line of weakness in, the closure. The solid deposit can be a gasket deposited around the closure and formed from the composition. Instead of, or in addition to the deposit being such a gasket, the composition can be deposited on the inner face of a closure at a position where there is a discontinuity or line of weakness around a push or pull component for opening a container sealed by the closure. The closure occupies, as is conventional, only a minor part of the exposed surface area of the closed container, often less than 25% of the surface area. Thus, the area of the solid deposit can be very small relative to the area of the container. Despite this, the invention can give greatly improved storage stability to the contents.

The invention also includes filled containers sealed with such closures. The sealed container comprises a container body, the closure fitted on it, and the packaged material that is contained within the container body. The container body is preferably of glass or metal. The closure is preferably of metal. The packaged material can be any beverage, foodstuff or other material that is to be stored within the container but the invention is of particular value when the filling is a material whose shelf-life or product quality is normally restricted due to oxygen ingress or contamination during storage. The container body can be a can, generally of metal, in which event the closure is a can end. Generally the entire closure is of metal or polymeric material but the panel of the closure can include a removable component of either metal or polymeric material.

Instead of a can body, the container body can be a bottle or jar in which event the closure is a cap. The bottle or jar is preferably of glass but it can be of polymeric material with very low oxygen permeability. The cap can be of polymeric material, for instance a polypropylene, that may include a barrier layer. Generally, the cap is formed of metal and may include a push or pull component of metal or polymeric material. The cap may be a crown cap such as a pry-off or twist-off crown, a twist-on cap, lug cap, press-on/twist-off, or press-on/pry-off cap, a screw-on cap, roll-on metal cap, continuous thread cap, or any other conventional form of metal cap or polymeric cap suitable for closing the bottle or jar.

A gasket is normally provided between the container body and the closure. This gasket can be used to carry the composition of the invention (in particular, as a polymer matrix containing composition) either as a blend in the gasket composition or as a separate component applied on or near the gasket but it is possible for the composition of the invention to be utilized elsewhere on the closure or elsewhere in the container. In that event the gasket-forming composition can be any unaltered conventional composition suitable for forming the gasket.

When the closure is a cap, the subject scavenger composition may form an overall gasket or a portion of an overall gasket. This is typically true for small diameter caps such as those less than 50 mm in diameter. For large diameter caps, the gasket is a ringlike gasket and may be deposited in a conventional manner from the gasket-forming composition. For instance, a ringlike gasket can be formed on a cap by being applied in liquid form as a ring and can then be converted to solid form by drying, heating to cure or cooling to set a thermoplastic, as appropriate. The oxygen scavenging composition could be blended into the gasket material, deposited on the gasket material, or applied to an area of the cap not covered by the gasket (the center panel). The gasket-forming composition may, for this purpose, be a dispersion, latex, plastisol, dry-blend, suitable thermoplastic composition or organic solution. The cap, carrying the gasket, is then pressed on to an appropriate sealing face around the open end of the filled container body and closed in conventional manner.

If the composition is formed with a thermoplastic polymer matrix, it may be applied as a low viscosity melt while the cap is spinning, so as to throw the composition into the form of a ring, or it may be applied as a melt which is then molded into the desired shape, often a disc having a thickened ring-like portion. Further, the gasket can be in the form of a pre-formed ring or disc which is retained (e.g., by mechanical or adhesive means) within the cap.

If the closure is a can end, the oxygen scavenging material is typically not used in the gasket composition because, under typical can seaming conditions, the gasket is not substantially exposed to oxygen in the pack. Also, the seams are not particularly vulnerable to oxygen ingress. The oxygen scavenging material is typically applied on a center panel or other interior surface in the can, such as applied as a coating of a can.

It is particularly preferred that the gasket or coating on the container closure be formed by applying a fluid or molten composition of the present invention formed with a polymer matrix and solidifying it on the closure. The method of application and solidification is generally conventional. It is particularly preferred that the container and can end should both be of metal or the container body should be of glass and the closure of metal or plastic, since the use of the defined compositions for forming the gasket then appears to give particularly beneficial results. In particular, excellent results are achievable when the container body is a glass bottle and the closure is a metal cap.

Instead of or in addition to using the fluid or meltable polymer matrix composition of the invention for forming a gasket, it is possible to deposit the composition elsewhere on the inner face of the closure. It may be applied as an overall coating of the inner face of the panel of the closure or it may be applied over only part of the inner face. In particular, when the panel includes one or more push or pull components defined in the panel by discontinuities or lines of weakness the composition may be applied primarily to cover just the discontinuity or line of weakness.

For instance one type of closure, usually a can end, includes at least one, and often two, push components that are defined by partial score lines through the metal panel such that finger pressure can push a circular area of the panel into the container, so as to allow access to the contents of the container. Thus there may be a small push component to allow release of pressure and a larger push component to allow pouring of liquid from the container. Such a system is described in, for instance, DE 3,639,426. In particular, the composition of the first embodiment of the present invention may be deposited as an annulus (or a disc) covering the line of weakness. The line of weakness may merely be a weakened line in the metal panel but it can be a total cut around the push component, for instance as in DE 3,639,426, in which event the push component generally has an area slightly larger than the opening in the panel that is defined by the cut line and the composition of the invention can then form a seal between the push component and the remainder of the panel of the closure.

In all instances where push or pull components are to be formed within a metal panel, there is a serious risk that the formation of the push or pull components may damage the polymeric lacquer coating that is generally present on the inner surface of the metal panel. This can expose the metal to corrosion. Application of a composition of the present invention to a container as described herein can both inhibit corrosion of the metal container as well as improve storage stability of the contents of the container, especially water bearing contents, such as beer.

In addition to use in metal, glass and plastic containers, the compositions can be used in a cardboard or laminated container such as a juice box. Such a container is a cardboard carton or tube with an interior liner. The composition can be placed in or layered with the interior liner of the cardboard package, along a line of weakness at the package closure, or at any other convenient location in the package. Alternately, the present composition can be placed within the container as a film, mat or sachet.

Further, the composition of the present invention can be compounded and extruded into desired shapes when the polymer matrix is a thermoplastic resin. For example, the subject compositions can be formed into films per se or as a component of a film composition used to prepare flexible packaging, such as bags, or the films can be laminated onto metal stock which can then be formed into cans and closures. Also, the compositions may be included in flexible packaging such as multilayer films or laminates or as a ribbon, patch, label or coating on a thermoplastic bag or lidstock. When the subject composition is part of a multilayer film, the layer formed of the present composition should be the surface layer which will be exposed to the inner surface of the resultant flexible package or should be an inner layer which is covered by a surface layer having high porosity to permit the $O_2$ and moisture to penetrate into and contact the layer containing the present composition. Thus, the term "exposed to the interior", as used herein and in the appended claims shall mean either direct or indirect exposure of the subject composition to the inner atmosphere of a sealed container having packaged product contained therein.

The compositions can also be used in conjunction with or as a portion of a tamper-evident membrane for pharmaceuticals and foods.

The following examples are given for illustrative purposes only and are not meant to be a limitation on the teaching herein or on the claims appended hereto. All parts and percentages are by weight unless otherwise stated.

Samples were generally prepared by first subjecting a high surface area, highly porous particulate material to elevated temperature for several hours to remove water from the pore structure. The oxygen scavenging ascorbate agent was dissolved in previously deoxygenated water and the solution was mixed with the particulate material to permit its impregnation into its pore structure. The water was then removed by subjecting the impregnated particulate to elevated temperature under partial vacuum until constant weight is achieved. In some instances the impregnated particulate, per se, was tested while in other instances the material was made part of a carrier polymer composition. To test for oxygen scavenging capability, each sample was placed in a gas impermeable, vacuum sealed container fitted with a septum to allow gas to be introduced and gas samples removed for periodic analysis. Some samples were in the containers having a pH 5.4 aqueous buffer food pack simulant or water while others merely had the sample material as if in a sachet. Containers having a sample were injected with 100 cc of room air (ca. 20.6% $O_2$) and pasteurized at 65° C. for 45 minutes and then stored in the dark to avoid photo-oxidation. The headspace oxygen concentration was measured at regular intervals by withdrawing samples which were then analyzed using a MOCON® Model HS-750 Headspace Oxygen Analyzer. All samples were prepared and tested in triplicate and the data was averaged to obtain the reported values. Migration of material into the liquid pack simulant was measured using high pressure liquid chromatography (HPLC) using a Waters 600E Multisolvent System with a Waters WISP 717+Autosampler and PE-Nelson Turbochrom IV Data System. The detector used was a 214 nm UV LDC Spectrometer 3100 variable wavelength detector. The column used to carry out the analysis was a Bio-Rad Ion Ex HPX-87H. All data was normalized to 200 mg sample size which corresponds to a typical crown liner material.

EXAMPLE 1

A series of samples were prepared using different commercially available silica powders as the porous particulate material. Each silica powder sample was formed by drying 20 parts of the powder in a nitrogen atmosphere oven at 200° C. for several hours and then cooling it in a dessicator. 4 parts of sodium ascorbate was dissolved in 25–50 parts of deoxygenated purified water to provide a solution volume to pore volume which ranged from 1:2 to 2:1 and all were suitable as providing incipient wetness. The solution was mixed with the dry silica powder under nitrogen to provide a paste slurry having good distribution of the ascorbate in the silica. The slurry was vacuum dried at 60° C. for 18–20 hours under nitrogen and then allowed to cool and stored. The silica samples so produced are described in Table I below.

TABLE 1

Impregnated Silica Materials

| Sample Number | Silica Type | Particle Size (μm) | Average Pore Diameter (Å) | $N_2$ Pore Volume (cc/g) | BET Surface Area (m²/g) | pH[1] | Wt percent Sodium Ascorbate |
|---|---|---|---|---|---|---|---|
| 1 | A | 25 | 470 | 1.05 | 138 | 7.14 | 16.7 |
| 1A[2] | A | 25 | 470 | 1.05 | 138 | 7.14 | 15.0 |
| 2[3] | B | 8 | 30 | 0.44 | 706 | 3.55 | 16.7 |
| 3[3] | C | 8 | 26 | 0.38 | 723 | 4.40 | 16.7 |
| 4 | D | 9 | 120 | 1.13 | 352 | 7.20 | 16.7 |
| 5 | E | 9 | 191 | 1.81 | 365 | 3.59 | 16.7 |
| 6 | F | 12 | 230 | 0.62 | 216 | 7.68 | 16.7 |
| 7[3] | G | 7 | 4 | 0.4 | 700 | 12.22 | 16.7 |
| 8[3] | H | | | | | 5.86 | 16.7 |

[1]pH was measured by suspending 1.0 of the silica powder in 12 g of Milli-Q-Water and shaking for 3½ hours.
[2]Sample was prepared using 1.5 parts ascorbate in 10 parts water mixed with 10 parts of silica type A.
[3]Samples were prepared using 4 parts ascorbate in 25 parts water with 20 parts of silica. The remaining samples used 50 parts water.

EXAMPLE 2

Headspace Oxygen Scavenging Test Method—Dry Pack

With each ascorbate loaded silica prepared in Example 1, triplicate samples of 1.5 g were placed into a gas impermeable container and vacuum sealed. The containers were each fitted with a septum to allow gas to be introduced to the container, and gas samples withdrawn. Each container was injected with 100 cc of room air (~20.6% $O_2$), and the samples heated at 65° C. for 45 minutes in a temperature controlled convection oven (to simulate pasteurization conditions typical for beverages, e.g., beer). Samples were then stored in the dark to avoid photo-oxidation of the ascorbate. The headspace $O_2$ concentration was measured at regular intervals by withdrawing approximately 3 cc samples which were then injected into a MOCON® model HS 750 Headspace $O_2$ Analyzer and results are reported in Table 2 below.

TABLE 2

Oxygen Scavenging Data - Dry Pack
Sodium Ascorbate Loaded Inorganic Powders

| Sample No. | Silica Sample | Rate During Pasteurization (mg $O_2$/200 mg/d) | Capacity 1 Day (mg $O_2$/200 mg) | Capacity 7 Days (mg $O_2$/200 mg) | Capacity 2 weeks (mg $O_2$/200 mg) |
|---|---|---|---|---|---|
| 9 | Control[1] | 0 | 0 | 0.1 ± 0.1 | 0.2 ± 0.1 |
| 10 | 1 | 14.1 ± 0.3 | 0.92 ± 0.02 | 1.7 ± 0.2 | 2.4 ± 0.3 |
| 11 | 1A | 2.5 ± 0.6 | — | 0.4 ± 0.002 | 0.64 ± 0.7 |
| 12 | 2 | 21.88 ± 0.06 | 1.24 ± 0.01 | 2.9 ± 0.3 | 4.6 ± 0.3 |
| 13 | 3 | 24 ± 2 | 1.2 ± 0.1 | 3.2 ± 0.1 | 4.7 ± 0.3 |
| 14 | 4 | 28.4 ± 0.5 | 1.69 ± 0.05 | 2.5 ± 0.4 | 3.3 ± 0.4 |
| 15 | 4B[2] | 176 ± 4 | 9.7 ± 0.2 | 15.4 ± 0.4 | 18 ± 0.6 |
| 16 | 5 | 23 ± 2 | 1.5 ± 0.2 | 2.6 ± 0.07 | 3.56 ± 0.05 |
| 17 | 6 | 24 ± 4 | 1.5 ± 0.4 | 2.8 ± 0.3 | 3.1 ± 0.3 |
| 18 | 7 | 3 ± 3 | 9.1 ± 0.003 | 0.15 ± 0.3 | 0.7 ± 0.4 |
| 19 | 8 | 9 ± 2 | 0.45 ± 0.01 | 1.1 ± 0.1 | 2.0 ± 0.2 |

[1]Control composed of Sodium Ascorbate powder (0.25 part).
[2]Sample particulate as 4 except aged for 6 months under dry $N_2$.

EXAMPLE 3

The procedure of Example 2 was repeated with respect to Sample 1A except that the container further contained a small cotton pad dampened with 1 ml of 5.4 pH buffer solution to provide a humid atmosphere within the container. The sample, when compared to Sample 1A of Table 2 having dry conditions, shows that its oxygen scavenging rate and capacity are triggered and enhanced by the presence of moisture in the oxygen atmosphere.

TABLE 3

| Example No. | Silica Sample | Condition | Rate of Pasteurization | Capacity 1 Day | Capacity 7 Days | Capacity 14 Days |
|---|---|---|---|---|---|---|
| 11 | 1A | Dry | 2.5 ± 0.6 | — | 0.4 ± 0.002 | 0.64 ± 0.7 |
| 11H | 1A | Humid | 35 ± 3 | 2.0 ± 0.3 | 4.01 ± 0.03 | 4.06 ± 0.03 |

EXAMPLE 4

Comparative—Silica Powder Mixed with Sodium Ascorbate

The effect of the silica powders on the sodium ascorbate was measured by a mixture of 1.25 parts of pure oven dried silica material (not impregnated) with 0.25 part of sodium ascorbate powder in the test containers and vacuum sealing. This was to measure the effect of just mixing the two materials together versus forming impregnated material. The samples were treated and tested as in Example 2 and the results are reported herein below in Table 4.

TABLE 4

Oxygen Scavenging Data for Mixed Samples in Dry Atmosphere

| Example No. | Silica Sample | Rate During Pasteurization (mg $O_2$/200 mg/d) | Capacity 1 Day (mg $O_2$/200 mg) | Capacity 7 Days (mg $O_2$/200 mg) | Capacity 2 Weeks (mg $O_2$/200 mg) |
|---|---|---|---|---|---|
| 20 | 1 | 0 | 0 | 0 | 0 |
| 21 | 6 | 0 | 0 | 0 | 0 |
| 22 | 4 | 0 | 0 | 0 | 0 |
| 23 | 5 | 0 | 0 | 0 | 0 |
| 25[1] | 4 | 0 | 0 | 0 | 0 |

[1]silica treated with 40 ml water and then vacuum dried.

As can be seen by the data in Table 4, simply mixing the silica powders and sodium ascorbate together does not facilitate oxygen scavenging. Indeed, even Sample 25, which contained the water treated silica and sodium ascorbate did not show oxygen scavenging. This indicates that it is the intimate loading of the sodium ascorbate into the pores of the silica which is facilitating the oxygen scavenging reaction in the dry test environment.

EXAMPLE 5

Alumina Impregnated with Ascorbate

Calcined alumina powder (Davison SRS Alumina) was placed on a tray and dried at 200° C. for 1.5 hours, with occasional stirring. The dried alumina was then put in a desiccator to cool to room temperature. To 10 parts of the dried alumina was added 1.5 parts sodium ascorbate dissolved in 10 parts of deoxygenated, purified water. The mixture looked like wet sand. The wet alumina was dried under vacuum at 60° C. overnight to remove the water. The vacuum oven was then cooled to room temperature under nitrogen. The ascorbate loaded alumina was brown in color and had 15 wt percent sodium ascorbate impregnated throughout the alumina.

EXAMPLE 6

The ascorbate impregnated particulate materials of Example 5 above were tested according to the procedures of Example 2 (dry conditions) and Example 3 (humid conditions). The results are given in Table 5 below.

measurably when it is dry. These results indicate that not all of the water is being removed from the samples especially the impregnated silica samples.

EXAMPLE 7

Preparation of PVC Plastisol Samples 1.0065 parts of each of the ascorbate loaded silicas (1A contains 0.1313 g, 0.6627 mmol sodium ascorbate while the remaining contain 0.168 g, 0.8479 mmol sodium ascorbate) prepared in Example 1, was mixed with 15 parts PVC plastisol composed of polyvinyl chloride in diisooctylphthalate plus a foaming agent (Darex® CR3692M) to form a plastisol loaded with sodium ascorbate impregnated silica particulate material. A film of the plastisol was cast onto an aluminum mold (2 in. diameter×40 mil thick disc) and the film fused at 220° C. for 4 minutes in a hot-plate oven. Each of the fused PVC plastisol samples were removed from the mold, weighed (samples were approximately 1.5 g), and then placed in gas tight containers having 10 parts of pH 5.4 phosphate buffer solution, vacuum sealed and treated and tested as described in Example 2. Results are given in Table 6 below.

TABLE 5

Oxygen Scavenging Data for Sodium Ascorbate Loaded Inorganic Powders

| Example No. | Scavenger Formulation | Rate During Pasteurization (mg O$_2$/200 mg/d) | Capacity 1 Day (mg O$_2$/200 mg) | Capacity 7 Day (mg O$_2$/200 mg) | Capacity 2 Weeks (mg O$_2$/200 mg) |
|---|---|---|---|---|---|
| 26 | NaAsc/Alumina/Dry | 10.3 ± 0.6 | 0.74 ± 0.06 | 1.4 ± 0.1 | 1.7 ± 0.2 |
| 26H | NaAsc/Alumina/Humid | 20.4 ± 0.4 | 1.40 ± 0.04 | 2.1 ± 0.2 | 2.2 ± 0.2 |

The scavenging rate during pasteurization and the capacity at 1 day are a measure of how rapidly the oxygen scavenging formulation would scavenge the residual oxygen contained in a food package, while the capacity at 2 weeks is a measure of the "useful" capacity of the material.

The data in Tables 1–5 clearly shows that the sodium ascorbate loaded inorganic materials function as oxygen

TABLE 6

Oxygen Scavenging Data for PVC Plastisol Samples - Moisture Pack

| Sample No. | Silica Sample | Rate During Pasteurization (mg O$_2$/200 mg/d) | Capacity 1 Day (mg O$_2$/200 mg) | Capacity 7 Days (mg O$_2$/200 mg) | Capacity 2 Weeks (mg O$_2$/200 mg) |
|---|---|---|---|---|---|
| Control | NaAsc 0.168 g | 1.2 ± 0.01 | 0.13 ± 0.01 | 0.28 ± 0.01 | 0.29 ± 0.01 |
| 27 | 1 | 1.2 ± 0.2 | 0.14 ± 0.02 | 0.22 ± 0.02 | 0.22 ± 0.02 |
| 28 | 1A | 0.87 ± 0.04 | 0.09 ± 0.01 | 0.11 ± 0.004 | 0.12 ± 0.005 |
| 29 | 2 | 1.3 ± 0.07 | 0.11 ± 0.01 | 0.20 ± 0.05 | 0.17 ± 0.01 |
| 30 | 3 | 1.2 ± 0.2 | 0.12 ± 0.01 | 0.16 ± 0.02 | 0.18 ± 0.01 |
| 31 | 4 | 1.5 ± 0.1 | 0.13 ± 0.002 | 0.17 ± 0.02 | 0.19 ± 0.02 |
| 32 | 5 | 1.19 ± 0.06 | 0.11 ± 0.01 | 0.15 ± 0.01 | 0.15 ± 0.01 |
| 33 | 6 | 1.2 ± 0.07 | 0.16 ± 0.01 | 0.29 ± 0.01 | 0.29 ± 0.01 |
| 34 | 7 | 1.6 ± 0.3 | 0.14 ± 0.01 | 0.18 ± 0.01 | 0.19 ± 0.01 |
| 35 | 8 | 0.74 ± 0.01 | 0.07 ± 0.001 | 0.07 ± 0.001 | 0.09 ± 0.01 | scavengers, even under "dry" conditions. This is in contrast to pure sodium ascorbate, which does not scavenge oxygen The data in Table 6 shows results for PVC formulations containing sodium ascorbate loaded silica samples, as well as a control. As can be seen by the data, the incorporation of the ascorbate into the silica does not inhibit ascorbate scavenging in the PVC matrix. The oxygen scavenging rate (Rate During Pasteurization) for the samples 26–33 are similar to the control sample.

EXAMPLE 8

Loading of 30.0% Sodium Ascorbate on Silica

Samples of ascorbate loaded silica powder containing a higher amount of sodium ascorbate were prepared following the procedure of Example 1. To 20 parts of dried silica powder was added an aqueous solution of sodium ascorbate (8.57 g sodium ascorbate/25–50 ml deoxygenated, purified water). The mixture was dried in a vacuum oven at 60° C. overnight. The sample was stirred to break up clumps and heating continued until a constant weight was obtained. Table 7 shows the materials prepared.

EXAMPLE 9

Headspace Oxygen Scavenging Test Method—Dry Pack

The 30% ascorbate loaded silica prepared in Example 8 above, (0.83 g, which contains 0.25 g sodium ascorbate) were each placed into gas impermeable containers and vacuum sealed. The samples were treated and tested as detailed in Example 2. Results are given in Table 7 below.

(Control), which does not scavenge oxygen measurably when it is dry. Again, these results indicate that although the samples have been dried to constant weight in a heated vacuum oven, the inorganic materials facilitate the oxygen scavenging reaction.

EXAMPLE 10

PVC Formulation of 30% Ascorbate Loaded Silica

To 15 parts of PVC plastisol, was added 1.0065 parts of the ascorbate impregnated silicas prepared in Example 8 (which contains 0.304 g sodium ascorbate). The plastisol was prepared and tested as detailed in Example 8. In addition, for comparative purposes, a sample was formed by mixing 15 parts of PVC plastisol (Darex® CR 3692M) with 0.304 g of sodium ascorbate powder. A film of the plastisol was prepared and tested. Results are given in Table 8.

TABLE 7

Oxygen Scavenging Data - Dry Pack

| Sample No. | Silica Sample | Rate During Pasteurization (mg $O_2$/200 mg/d) | Capacity 1 Day (mg $O_2$/200 mg) | Capacity 7 Days (mg $O_2$/200 mg) | Capacity 2 Weeks (mg $O_2$/200 mg) |
| --- | --- | --- | --- | --- | --- |
| Control | NaAsc (0.25 g) | 0 | 0 | 0 | 0 |
| 36 | 1 | 14 ± 1 | 0.91 ± 0.01 | 1.55 ± 0.01 | 2.5 ± 0.1 |
| 37 | 2 | 15 ± 1 | 0.91 ± 0.01 | 1.56 ± 0.01 | 2.40 ± 0.1 |
| 38 | 3 | 7 ± 1 | 0.45 ± 0.01 | 0.73 ± 0.06 | 1.01 ± 0.06 |
| 39 | 4 | 22.4 ± 0.1 | 1.36 ± 0.01 | 2.57 ± 0.05 | 3.70 ± 0.04 |
| 40 | 5 | 19.56 ± 0.06 | 1.06 ± 0.07 | 1.3 ± 0.6 | 1.8 ± 0.8 |
| 41 | 6 | 15 ± 1 | 0.7 ± 0.1 | 0.7 ± 0.6 | 1 ± 1 |
| 42 | 8 | 18.2 ± 0.1 | 0.99 ± 0.07 | 1.74 ± 0.07 | 2.7 ± 0.1 |

The data in Table 7 clearly shows that the sodium ascorbate loaded inorganic materials function as oxygen

TABLE 8

Oxygen Scavenging Data for PVC Formulations - Aqueous Pack

| Sample No. | Silica Sample | Rate During Pasteurization (mg $O_2$/200 mg/d) | Capacity 1 Day (mg $O_2$/200 mg) | Capacity 7 Days (mg $O_2$/200 mg) | Capacity 2 Weeks (mg $O_2$/200 mg) |
| --- | --- | --- | --- | --- | --- |
| Control | NaAsc 0.304 g | 0.65 ± 0.01 | 0.07 ± 0.002 | 0.19 ± 0.004 | 0.35 ± 0.01 |
| 43 | 1 | 1.4 ± 0.3 | 0.16 ± 0.01 | 0.43 ± 0.01 | 0.57 ± 0.01 |
| 44 | 2 | 0.93 ± 0.03 | 0.12 ± 0.01 | 0.35 ± 0.01 | 0.52 ± 0.01 |
| 45 | 3 | 0.8 ± 0.2 | 0.11 ± 0.01 | 0.32 ± 0.02 | 0.50 ± 0.02 |
| 46 | 4 | 1.39 ± 0.03 | 0.14 ± 0.01 | 0.39 ± 0.02 | 0.58 ± 0.03 |
| 47 | 5 | 1.39 ± 0.02 | 0.17 ± 0.02 | 0.41 ± 0.01 | 0.54 ± 0.01 |
| 48 | 6 | 0.95 ± 0.03 | 0.12 ± 0.01 | 0.36 ± 0.03 | 0.52 ± 0.02 |
| 49 | 8 | 0.82 ± 0.2 | 0.13 ± 0.01 | 0.37 ± 0.01 | 0.53 ± 0.03 | scavengers, even under "dry" conditions, as was seen in Table 2. This is in contrast to pure sodium ascorbate The data in Table 8 shows that the ascorbate loaded silicas function as well as or better than the control sodium ascorbate containing sample (Control). Again, as was seen in Table 6, the loading of the ascorbate into the pore structure of the silica has not had a negative effect on the oxygen scavenging performance of the PVC samples. In this series of tests, in fact, the sodium ascorbate loaded silica samples appear to scavenge faster than the PVC sample containing pure sodium ascorbate powder itself.

EXAMPLE 11

Migration Testing

Migration of oxidation by-products of sodium ascorbate was measured. The buffered water solution used in the above Examples was evaluated by HPLC analysis to quantify the amount of degradation products which had migrated out of the PVC plastisol formulation during headspace oxygen scavenging tests. The sample containers had each contained a 2 inch diameter PVC disk of ~1.5 g weight in 10 ml of buffered water. Specific acid concentrations as well as total migration, for all materials eluting through the column, (both acids and non-charged species, excluding the plasticizer), were measured on the samples, where possible. A Waters 600E Multisolvent System with a Waters WISP 717+Autosampler PE Nelson Turbochrome IV data system was used. The detector was a 213 nanometer UV LDC spectrometer 3100 variable wavelength detector. The column used for the analysis was a BioRad IonEx HPX-87H. The results are presented below in Table 9.

TABLE 9

Migration Results for 16.7%
Sodium Ascorbate Loaded Silica Samples in PVC

| Sample Number | Silica Sample | Quantity of Acids Migrating (Oxalic + Glyceric + Formic) $\mu g/ml$ | By-product Migration of all degradation products, Normalized to Control NaAcs Sample |
|---|---|---|---|
| Control | NaAsc | 295 ± 5 (plus contains a major unidentified peak not seen in others) | 1.0 |
| 50 | 1 | 160 ± 10 | 0.5 |
| 51 | 2 | 25 ± 5 | 0.31 |
| 52 | 3 | 30 ± 5 | 0.39 |
| 53 | 4 | 20 ± 10 | 0.17 |
| 54 | 5 | 50 ± 5 | 0.52 |
| 55 | 6 | 367 ± 58 | 1.0 |
| 56 | 7 | 100 ± 10 | 0.97 |
| 57 | 8 | <D.L. | 0.39 |

It can be seen by the data in Table 9, that the absorption of the sodium ascorbate into the pore structures of the silica material at the 16.7% loading level, prior to the incorporation into the PVC matrix resin, gives a formulation which has reduced the amount of degradation products migrating into the solution pack simulant. The total by-product migration was reduced by as much as 80% with most of the samples showing 50–60% reductions.

EXAMPLE 12

20 parts of silica powder of Type D was dried in an oven for several hours at 200° C., with occasional stirring to remove water from the pore structure, and then cooled in a dessicator. 4 parts of sodium ascorbate was dissolved in 25 ml of deoxygenated purified water. The ascorbate/water solution was mixed with the dry silica powder and dried in the same manner as described in Example 1.

0.675 part of the ascorbate loaded silica prepared above, was blended into 15 parts of a PVC plastisol (polyvinyl chloride in diisooctylphthalate without foaming agent) to form a plastisol/sodium ascorbate loaded silica blend. The addition of the ascorbate loaded silica was noted to cause a slight increase in the viscosity of the plastisol. A film of the plastisol was cast onto an aluminum mold (2 in. diameter×40 mil thick disc) and the film fused at 215° C. for 3 minutes in a hotplate oven. The fused PVC plastisol sample was removed from the mold, weighed (samples were approximately 1.5 g), and then placed in gas tight containers with 10 ml of pure water and vacuum sealed. The containers were each fitted with a septum to allow gas to be introduced and gas samples withdrawn. Each container was injected with 100 cc of room air (~20.6% $O_2$), and the samples heated at 65° C. for 45 minutes in a temperature controlled convection oven (to simulate pasteurization conditions). Samples were then stored in the dark to avoid photo-oxidation of the ascorbate. The headspace $O_2$ concentration was measured at regular intervals by withdrawing approximately 3 cc samples which were then injected with a MOCON® model HS 750 Headspace $O_2$ Analyzer and results calculated as detailed in Table 10 below.

EXAMPLE 13

0.675 part of the ascorbate loaded silica prepared in Example 12, was blended into 15 parts PVC plastisol to form a plastisol/sodium ascorbate loaded silica blend. To this was added 0.0061 part of copper sulfate ($CuSO_4 \cdot 5H_2O$, 25:1 mole ratio of ascorbate to copper) with thorough blending. Samples were prepared and tested as described in Example 12 above. The results are given in Table 10 below.

EXAMPLE 14

5 parts of the ascorbate loaded silica prepared in Example 12 was added to a solution of 0.0421 part of copper sulfate ($CuSO_4 \cdot 5H_2O$, 25:1 mole ratio of ascorbate to copper) dissolved in 5 ml of deoxygenated water. The slurry was thoroughly mixed to allow the copper sulfate to migrate into the pores of the silica. The sample was dried as detailed in Example 12.

0.675 parts of the copper loaded/ascorbate loaded silica was added to 15 parts PVC plastisol and samples were prepared and tested as described in Example 12. The results are given in Table 10 below.

EXAMPLE 15

20 parts of silica Type D was mixed with a solution of 0.2022 part copper sulfate in 40 parts of deoxygenated water. The slurry was thoroughly stirred and the sample dried in a vacuum oven at 60° C. to constant weight. To this copper sulfate loaded silica was then added a solution of 4 parts sodium ascorbate in 40 parts of deoxygenated water. The slurry was thoroughly stirred and the sample then dried in a vacuum oven at 60° C. to constant weight.

0.675 parts of the copper loaded/ascorbate loaded silica was added to 15 parts PVC plastisol and samples were prepared and tested as detailed in Example 12. The results are given in Table 10 below.

EXAMPLE 16

20 parts of silica Type D was mixed with a solution having 0.2022 part copper sulfate and 4 parts sodium ascorbate in 40 parts deoxygenated water. The slurry was thoroughly stirred and the sample dried in a vacuum oven at 60° C. to constant weight.

0.675 parts of the copper loaded/ascorbate loaded silica was added to 15 part PVC plastisol and samples were prepared and tested as detailed in Example 12. The results are given in Table 10 below.

TABLE 10

Oxygen Scavenging Data for Ascorbate-Loaded Silica With and Without $CuSO_4$ in PVC

| Sample No. | Experiment No. | Rate During Pasteurization (mg $O_2$/200 mg/d) | Capacity 1 Day (mg $O_2$/200 mg) | Capacity 7 Days (mg $O_2$/200 mg) | Capacity 2 Weeks (mg $O_2$/200 mg) |
| --- | --- | --- | --- | --- | --- |
| Control | NaAsc (0.11 g) | 0.57 ± 0.02 | 0.04 ± 0.008 | 0.135 ± 0.012 | 0.19 ± 0.008 |
| 58 | 12 | 0.30 ± 0.01 | 0.02 ± 0.001 | 0.02 ± 0.009 | 0.034 ± 0.004 |
| 59 | 13 | 0.28 ± 0.006 | 0.03 ± 0.009 | 0.03 ± 0.009 | 0.033 ± 0.007 |
| 60 | 14 | 0.51 ± 0.023 | 0.034 ± 0.001 | 0.039 ± 0.009 | 0.039 ± 0.006 |
| 61 | 15 | 0.93 ± 0.16 | 0.091 ± 0.009 | 0.118 ± 0.016 | 0.113 ± 0.010 |
| 62 | 16 | 0.81 ± 0.12 | 0.062 ± 0.008 | 0.078 ± 0.009 | 0.078 ± 0.009 |

EXAMPLE 17

Alternate Formation of Hydrotalcite Impregnated with Sodium Ascorbate 30 parts of hydrotalcite (Alcoa, treated at 600° C. for 4 hours) was added to approximately 200 parts de-ionized water. The resulting slurry was deoxygenated by bubbling nitrogen through the solution under a nitrogen atmosphere. Approximately parts of sodium ascorbate was added to the hydrotalcite slurry to produce a solution of pH 11. Additional ascorbate was added to the solution to lower the pH to 9. The solution was allowed to stir overnight under a nitrogen atmosphere, was then vacuum filtered and allowed to dry while under the nitrogen atmosphere. A beige powder containing 17.7% ascorbate was obtained. 0.5 gram samples of the ascorbate impregnated particulate material was tested under dry and humid conditions. The results are given in Table 11 below.

TABLE 11

| Example No. | Scavenger Formulation | Capacity 1 Day (mg $O_2$/200 mg) | Capacity 7 Day (mg $O_2$/200 mg) | Capacity 2 Weeks (mg $O_2$/200 mg) |
| --- | --- | --- | --- | --- |
| XI | NaAsc/Hydrotalcite/Dry | 0.11 | 0.65 | 1.57 |
| XI-H | NaAsc/Hydrotalcite/Humid | 0.55 | 2.21 | 2.36 |

The capacity at 1 day are a measure of how rapidly the oxygen scavenging formulation would scavenge the residual oxygen contained in a food package, while the capacity at 2 weeks is a measure of the "useful" capacity of the material.

The data shows that the sodium ascorbate loaded hydrotalcites function as oxygen scavengers, even under "dry" conditions. This is in contrast to pure sodium ascorbate, which does not scavenge oxygen measurably when it is dry.

What is claimed:

1. An oxygen scavenging composition comprising a carrier containing a moisture-triggerable oxygen scavenger agent impregnated and contained in a high surface area, porous particulate material, said particulate material being an inorganic material having a surface area of from 1 to 950 $m^2/g$ (BET); a pore volume of at least 0.007 cc/g; a pore diameter of at least 3 Angstroms; and a particle diameter of from 0.007 to 100 microns and said oxygen scavenger agent is selected from the group consisting of a sulfite, bisulfite, dithionate salt of an alkali or alkaline earth metal, ascorbate compound or a phenolic compound.

2. The composition of claim 1 wherein said oxygen scavenging agent is an ascorbate compound selected from the group consisting of D-ascorbic acid, L-ascorbic acid, their alkali metal salts, their alkaline earth metal salts, their fatty acid derivatives and mixtures thereof.

3. The composition of claim 2 wherein the ascorbate compound is sodium ascorbate.

4. The composition of claim 2 wherein the oxygen scavenger agent further comprises at least one metal compound wherein the metal is selected from the group consisting of scandium, titanium, vandium, chromium manganese, iron, cobalt, nickel, copper, zinc, tin and mixtures thereof.

5. The composition of claim 3 wherein the scavenger agent further comprises at least one metal compound wherein the metal is selected from the group consisting of scandium, titanium, vandium, chromium manganese, iron, cobalt, nickel, copper, zinc, tin and mixtures thereof.

6. The composition of claim 4 wherein the transition metal is copper.

7. The composition of claim 5 wherein the transition metal is copper.

8. The composition of claim 1 wherein the oxygen scavenger agent is selected from a sulfite, bisulfite, or dithionate salt of an alkali or alkaline earth metal.

9. The composition of claim 1, 2, 3, 4, 5, 6, 7, or 8 wherein the porous particulate material is selected from the group consisting of water-insoluble material of the group consisting essentially of metal oxides, sulfides or hydroxides; metal carbonates; minerals; synthetic and natural zeolites; metal silicates; alumina; silica gels; carbon; aluminum phosphate; calcined hydrotalcites; and mixtures thereof.

10. The composition of claim 1, 2, 3, 4, 5, 6, 7, or 8 wherein the porous particulate material is selected from the group consisting of oxides of silicon, aluminum, or titanium; hydroxides of silicon, aluminum or titanium; natural zeolite; synthetic zeolite; hydrotalcite; and mixtures thereof.

11. The composition of claim 1, 2, 3, 4, 5, 6, 7, or 8 wherein the carrier comprises a polymeric matrix having at least about 0.1 weight percent of said impregnated porous material distributed therein.

12. The composition of claim 9 wherein the carrier comprises a polymeric matrix having at least about 0.1 weight percent of said impregnated porous material distributed therein.

13. The composition of claim 11 wherein the polymer matrix is a thermoplastic resin selected from the group consisting of polyethylene, ethylene/vinyl acetate copolymers, vinyl chlorides homopolymers, vinyl chloride copolymers and blends thereof.

14. The composition of claim 11 wherein the polymer matrix comprises polyethylene selected from the group consisting of high, low, very low, ultra low, and linear low density polyethylenes, blends thereof and blends of said polyethylene with other polymers.

15. The composition of claim 11 wherein the polymer matrix comprises a mixture of at least one polyethylene and at least one ethylene/vinyl acetate copolymer.

16. The composition of claim 11 wherein the polymer matrix comprises a polymer selected from the group consisting of polyolefin, ethylene/vinyl acetate copolymer, butyl rubber, styrene/butadiene rubber, styrene/butadiene/styrene block copolymers, isoprene, styrene/isoprene/styrene block copolymers styrene/ethylene/butylene/styrene block copolymers, and mixtures thereof.

17. The composition of claim 11 wherein the polymeric material is selected from the group consisting of the epoxides, phenolics, polyurethanes, polyvinyl chloride homopolymer, polyvinyl chloride copolymers and mixtures thereof.

* * * * *